(12) United States Patent
Shpak

(10) Patent No.: US 10,021,067 B2
(45) Date of Patent: Jul. 10, 2018

(54) INTERNET PROTOCOL ADDRESS DISTRIBUTION FOR WIRELESS NETWORK

(71) Applicants: Allied Telesis Holdings Kabushiki Kaisha, Tokyo (JP); Allied Telesis, Inc., San Jose, CA (US)

(72) Inventor: Eran Shpak, Tel Aviv (IL)

(73) Assignee: ALLIED TELESIS HOLDINGS KABUSHIKI KAISHA, Tokyo (JP)

( * ) Notice: Subject to any disclaimer, the term of this patent is extended or adjusted under 35 U.S.C. 154(b) by 449 days.

(21) Appl. No.: 14/733,641

(22) Filed: Jun. 8, 2015

(65) Prior Publication Data

US 2016/0359802 A1 Dec. 8, 2016

(51) Int. Cl.
*G06F 15/177* (2006.01)
*H04L 29/12* (2006.01)

(52) U.S. Cl.
CPC ...... *H04L 61/2015* (2013.01); *H04L 61/6022* (2013.01)

(58) Field of Classification Search
CPC .................. H04L 61/2015; H04L 61/6022
See application file for complete search history.

(56) References Cited

U.S. PATENT DOCUMENTS

| | | | | |
|---|---|---|---|---|
| 8,284,783 | B1* | 10/2012 | Maufer | H04L 61/103 370/351 |
| 9,686,143 | B2* | 6/2017 | Krithivas | H04L 41/12 |
| 2010/0103884 | A1* | 4/2010 | Doherty | H04L 45/586 370/329 |
| 2014/0185455 | A1* | 7/2014 | Balasubramanian | H04W 4/06 370/241 |

* cited by examiner

*Primary Examiner* — Ryan Jakovac
(74) *Attorney, Agent, or Firm* — Michael Zarrabian; Pejman Yedidsion; Brooks Acordia IP Law, PC

(57) ABSTRACT

Some embodiments provide a system that includes an Internet Protocol (IP) address distribution device and an access point. The IP address distribution device may be configured to allocate IP addresses for a set of devices. The access point may be configured to communicate wirelessly with the set of devices. The IP address distribution device may be is further configured to receive IP address request messages from the set of devices via the access point. The IP address request messages may be for requesting IP addresses from the IP address distribution device. The IP address distribution device may be further configured to send IP address response messages that include IP addresses for the set of devices to the set of devices via the access point using unicast messaging.

20 Claims, 15 Drawing Sheets

400

RECEIVING IP ADDRESS REQUEST MESSAGE FROM REQUESTING DEVICE
410

ALLOCATING IP ADDRESS FOR REQUESTING DEVICE
420

GENERATING IP ADDRESS RESPONSE MESSAGE BASED ON ALLOCATED IP ADDRESS
430

SENDING IP ADDRESS RESPONSE MESSAGE TO REQUESTING DEVICE VIA UNICAST MESSAGING
440

Figure 4

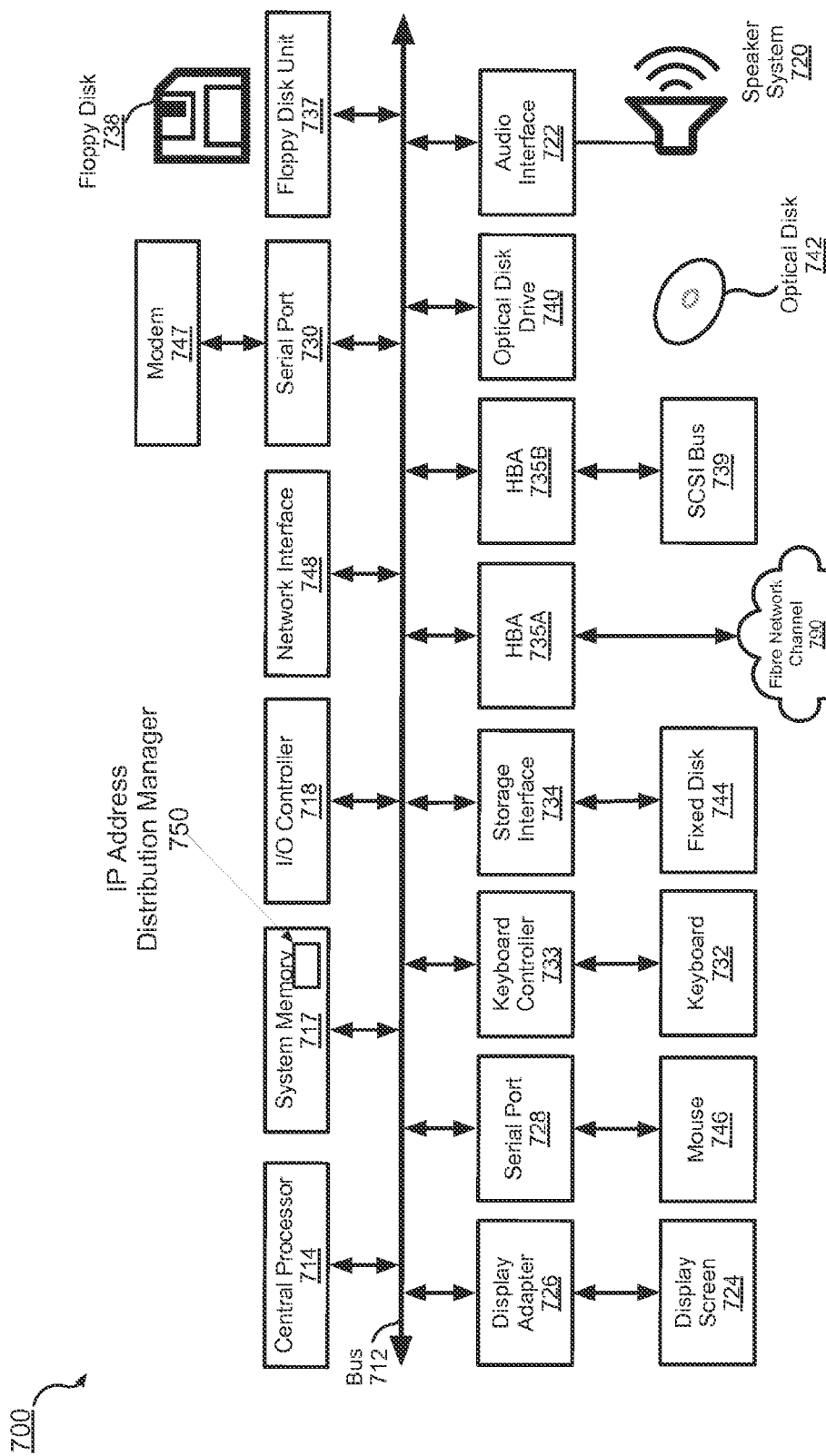

INTERNET PROTOCOL ADDRESS DISTRIBUTION FOR WIRELESS NETWORK

BACKGROUND

Many techniques are used today for connecting devices together, thereby allowing the devices to communicate with one another. For example, wireless networks may be used to connect devices in a large public venue (e.g., a library, an airport, a music concert, etc.) together so that the devices may communicate with one another and/or access the Internet. Some techniques for configuring devices (e.g., distributing IP addresses to the devices) for use in a network utilize broadcast messaging. Using such techniques over wireless networks may be unreliable.

SUMMARY

Accordingly, a need has arisen for a wireless network that distributes Internet Protocol (IP) addresses in a reliable and efficient manner. Further, there is a need to minimize the amount of broadcast and/or multicast communications over the wireless network when distributing IP addresses.

In some embodiments, a system includes an IP address distribution device and an access point. The IP address distribution device may be configured to allocate IP addresses for a set of devices. The access point may be configured to communicate wirelessly with the set of devices. The IP address distribution device may be further configured to receive IP address request messages from the set of devices via the access point. The IP address request messages may be for requesting IP addresses from the IP address distribution device. The IP address distribution device may be further configured to send IP address response messages that include IP addresses for the set of devices to the set of devices via the access point using unicast messaging.

In some embodiments, the IP address distribution device may be further configured to receive the IP address request messages from the set of devices, via the access point, using broadcast messaging. It is appreciated that the IP address distribution device may be a dynamic host configuration protocol (DHCP) server. In some embodiments, the IP address distribution device, the access point, and the set of devices are connected in a layer 2 network according to a flat network topology.

In some embodiments, each device in the set of devices has a media access control (MAC) address. The IP address request messages may each include a MAC address of a device in the set of devices. In some embodiments, the IP address request message may further include a response messaging mode indicator. It is appreciated that the response messaging mode indicator may indicate to send responses to the IP address request message using unicast messaging. It is also appreciated that the response messaging mode indicator may indicate to send responses to the IP address request message using a messaging mode other than unicast messaging. In some embodiments, the IP address distribution device may be further configured to send the IP address response messages to the set of devices via the access point using unicast messaging by sending the IP address response messages to the MAC addresses of the set of devices.

In some embodiments, a system includes an IP address distribution device, an access point, and an IP address distribution proxy device. The IP address distribution device may be configured to allocate IP addresses for a set of devices. The access point may be configured to communicate wirelessly with the set of devices. The IP address distribution proxy device may be configured to receive IP address request messages from the set of devices. The IP address distribution proxy device may be further configured to receive IP address request messages from the set of devices via the access point. The IP address request messages may be for requesting IP addresses from the IP address distribution device. The IP address distribution device may be further configured to send IP address response messages that include IP addresses allocated for the set of devices to the IP address distribution proxy device. The IP address distribution proxy device may be further configured to forward the IP address response messages to the set of devices via the access point using unicast messaging.

In some embodiments, the IP address distribution proxy device may be further configured to receive the IP address request messages from the set of devices, via the access point, using broadcast messaging. It is appreciated that the IP address distribution device may be a DHCP server. It is also appreciated that the IP address distribution proxy device may be a DHCP proxy server.

In some embodiments, each device in the set of devices has a media access control (MAC) address. The IP address request messages may each include a MAC address of a device in the set of devices. The IP address distribution proxy device may be further configured to extract the MAC addresses of the set of devices from the IP address request messages. The IP address distribution proxy device may be further configured to send the IP address response messages to the set of devices via the access point using unicast messaging by sending the IP address response messages to the MAC addresses of the set of devices.

In some embodiments, a system includes an IP address distribution device and an access point. The IP address distribution device may be configured to allocate IP addresses for a set of devices. The access point may be configured to communicate wirelessly with the set of devices. The IP address distribution device may be further configure to receive IP address request messages from the set of devices via the access point. The IP address request messages may be for requesting IP addresses from the IP address distribution device. The access point may be further configured to receive IP address response messages that include IP addresses for the set of devices from the IP address distribution device. The access point may be further configured to send the IP address response messages to the set of devices via the access point using unicast messaging.

In some embodiments, each device in the set of devices has a media access control (MAC) address. The IP address request messages may each include a MAC address of a device in the set of devices. The access point may be further configured to extract the MAC addresses of the set of devices from the IP address request messages. The access point may be further configured to send the IP address response messages to the set of devices using unicast messaging by sending the IP address response messages to the MAC addresses of the set of devices. In some embodiments, the IP address distribution device, the access point, and the set of devices are connected in a layer 2 network according to a flat network topology.

These and various other features and advantages will be apparent from a reading of the following detailed description.

BRIEF DESCRIPTION OF DRAWINGS

The embodiments are illustrated by way of example, and not by way of limitation, in the figures of the accompanying drawings and in which like reference numerals refer to similar elements.

FIG. 4 shows a flow diagram for handling the distribution of IP addresses in accordance with some embodiments.

FIG. 7 shows a block diagram of a computer system in accordance with some embodiments.

DETAILED DESCRIPTION

Figure 1A:
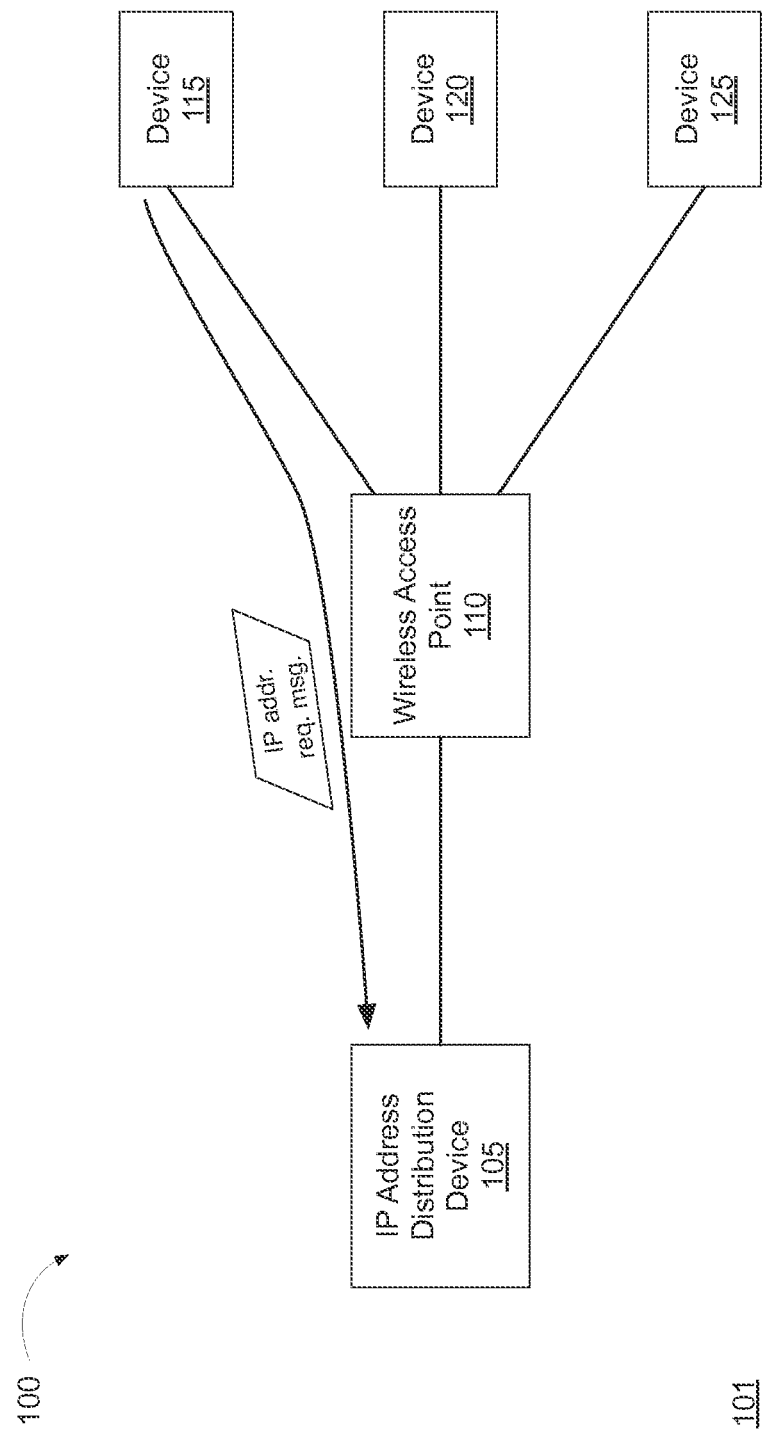
FIGS. 1A and 1B show an IP address distribution server in a network in accordance with some embodiments.

Reference will now be made in detail to various embodiments, examples of which are illustrated in the accompanying drawings. While various embodiments are described herein, it will be understood that these various embodiments are not intended to limit the scope of the embodiments. On the contrary, the embodiments are intended to cover alternatives, modifications, and equivalents, which may be included within the scope of the embodiments as construed according to the appended Claims. Furthermore, in the following detailed description of various embodiments, numerous specific details are set forth in order to provide a thorough understanding of the concept. However, it will be evident to one of ordinary skill in the art that the concept may be practiced without these specific details. In other instances, well known methods, procedures, components, and circuits have not been described in detail as not to unnecessarily obscure aspects of the concept and embodiments.

Some portions of the detailed descriptions that follow are presented in terms of procedures, logic blocks, processing, and other symbolic representations of operations on data bits within a computer memory. These descriptions and representations are the means used by those skilled in the data processing arts and data communication arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in an electronic device, a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "identifying," "creating," "generating," "storing," "allocating," "determining," "sending," "receiving," "transmitting," "communicating," "providing," "accessing," "associating," "disabling," "enabling," "configuring," "initiating," "starting," "terminating," "ending," "configuring," "extracting," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, etc. Embodiments described herein may be discussed in the general context of machine-executable instructions residing on some form of machine-readable storage medium, such as program modules, executed by one or more computers, computing devices, or other devices. By way of example, and not limitation, machine-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and non-volatile, removable and non-removable media implemented in any method or technology for storage of information such as machine-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of machine-readable storage media.

Embodiments described herein are directed to devices in networks that distribute IP addresses using unicast techniques. In some embodiments, such devices receive requests for IP addresses via broadcast messaging and send replies to the requests via unicast messaging.

Figure 1B:
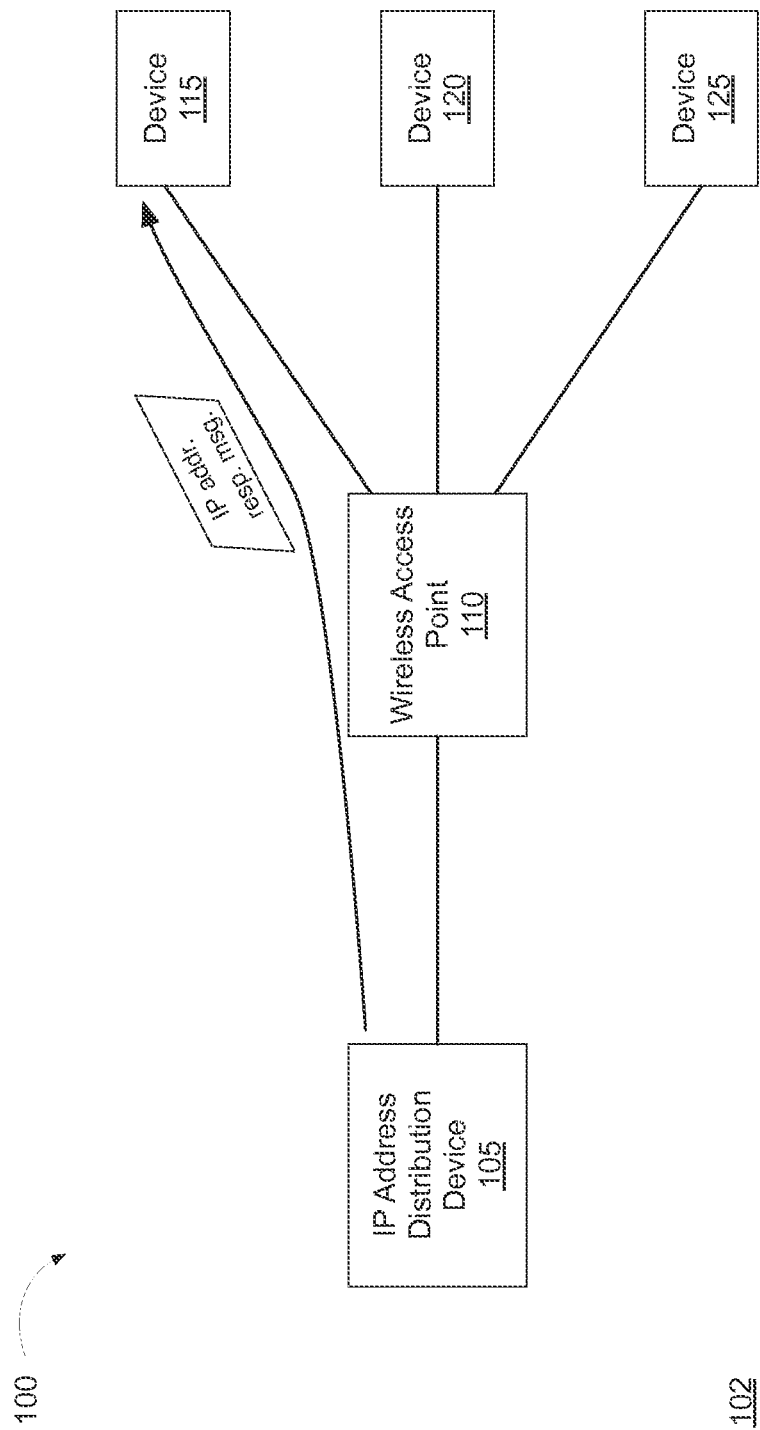

Referring now to FIGS. 1A and 1B, an IP address distribution device in a network 100 is shown in accordance with some embodiments. In particular, FIGS. 1A and 1B show an IP address distribution device in the network 100 at two different stages 101 and 102 of distributing an IP address to a device in accordance with some embodiments. Before describing the operation for distribution an IP address, the elements in network 100 will first be described.

As shown in FIGS. 1A and 1B, the network 100 includes an IP address distribution device 105, a wireless (e.g., Wi-Fi, 802.11, etc.) access point (AP) 110, and devices 115, 120, and 125. In this example, the IP address distribution device 105, the wireless AP 110, and the devices 115, 120, and 125 are connected in a layer 2 network according to a flat network topology. The wireless AP 110 and the devices 115, 120, and 125 may communicate with each other wirelessly. That is, the wireless AP 110 and the devices 115, 120, and 125 form a wireless network. The IP address distribution device 105 and the wireless AP 110 may communicate wirelessly or via a wired technology (e.g., Ethernet technologies)

The IP address distribution device 105 may be a computing device that is configured to handle the allocation of IP addresses for, and the distribution of IP address to, the devices 115, 120, and 125. The IP address distribution device 105 may be implemented as any type of device that allocates and distributes IP addresses for devices in a network. For instance, the IP address distribution device 105 may be a dynamic host configuration protocol (DHCP) server, a Bootstrap Protocol (BOOTP) server, etc.

The wireless AP 110 may be a networking device that is configured to allow devices 115, 120, and 125 to wirelessly connect to network 100. Specifically, the wireless AP 110 is configured to forward data to and from the devices 115, 120, and 125 over a layer 2 network. In some embodiments, the wireless AP 110 is also configured to route date to and from the devices 115, 120, and 125 over a layer 3 network. It is appreciated that the wireless AP 110 may use any number of different wireless technologies (e.g., Wi-Fi technologies) to connect with the devices 115, 120, and 125.

The devices 115, 120, and 125 may be any number of different types of devices. For example, any of the devices 115, 120, 125 may be a mobile phone, a smartphone, a smartwatch, a tablet device, a laptop computing device, a portable gaming device, a global positioning system (GPS) device, an image capture device, a video capture device, etc.

Referring now to FIG. 1A, the first stage 101 shows the device 115 sending an IP address request message to the IP address distribution device 105 via the wireless AP 110. The IP address request message includes a media access control (MAC) address of the device 115. In some embodiments, the IP address request message also includes a response messaging mode indicator (e.g., a broadcast bit in a header of the IP address request message) that indicates to send responses to the IP address request messages using unicast messaging (e.g., layer 2 unicast messaging and/or layer 3 unicast messaging). For this example, the IP address request message includes a response messaging mode indicator, which indicates to send responses to IP address request messages using unicast messaging.

The device 115 in this example sends the IP address request message via broadcast messaging (e.g., the device 115 sends the sends the IP address request message to IP address 255.255.255.255). In response to receiving the IP address request message, the wireless IP 110 broadcasts the message to the IP address distribution device 105. When the IP address distribution device 105 receives the IP address request message, the IP address distribution device 105 allocates an IP address from a pool of available IP addresses for the device 115.

Referring now to FIG. 1B, the second stage 102 shows the IP address distribution device 105 after the IP address distribution device 105 allocated an IP address for the device 115. Specifically, the IP address distribution device 105 is sending an IP address response message (e.g., an IP address acknowledgement message) to the device 115 via the wireless AP 110. The IP address response message includes the allocated IP address for the device 115.

In this example, the IP address distribution device 105 sends the IP address response message to the device 115 via unicast messaging. In some embodiments, the IP address distribution device 105 sends the IP address response message via unicast messaging when the response messaging mode indicator in the IP address request message indicates to send responses to IP address request messages using unicast messaging. In other embodiments, the IP address distribution device 105 sends the IP address response message via unicast messaging even if the response messaging mode indicator in the IP address request message indicates to send responses to IP address request messages using a messaging mode other than unicast messaging (e.g., broadcast messaging or multicast messaging). In other words, the IP address distribution device 105 in such other embodiments may send responses to IP address request messages using unicast messaging regardless of the messaging mode indicator specified in the IP address request message by device 115.

The IP address distribution device 105 sends the IP address response message via unicast messaging by extracting the MAC address of the device 115 from the IP address request message and sending the IP address response message to the extracted MAC address over the layer 2 network. When the device 115 receives the IP address response message, the device 115 configures itself with the IP address specified in the IP address response message.

Referring now to FIGS. 2A-2D, an IP address distribution proxy device in a network 200 is shown in accordance with some embodiments. Specifically, FIGS. 2A-2D show an IP address distribution proxy device in the network 200 at four different stages 201, 202, 203, and 204 of distributing an IP address to a device in accordance with some embodiments. FIGS. 2A-2D are similar to FIGS. 1A and 1B except FIGS. 2A-2D also include an IP address distribution proxy device 205. In this example, the IP address distribution proxy device 205, the wireless AP 110, and the devices 115, 120, and 125 are connected in a layer 2 network according to a flat network topology. The IP address distribution proxy device 205 and the wireless AP 110 may communicate wirelessly or via a wired technology (e.g., Ethernet technologies). In some embodiments, the IP address distribution proxy device 205 and the IP address distribution device 105 belong to the same layer 2 network, while, in other embodiments, the IP address distribution proxy device 205 and the IP address distribution device 105 belong to different layer 2 networks.

The IP address distribution proxy device 205 may be a computing device that is configured to handle IP address requests from the devices 115, 120, and 125. The IP address distribution proxy device 205, in turn, forwards the IP address requests to the IP address distribution device 105. The IP address distribution proxy device 205 receives responses to the IP address requests from the IP address distribution device 105 and forwards them to the devices 115, 120, and 125. The IP address distribution proxy device 205 may be implemented as any type of device that serves as a proxy and/or relay for IP address distribution devices in a network. For example, the IP address distribution proxy device 205 may be a DHCP proxy/relay server, BOOTP proxy/relay server, etc.

Figure 2A:
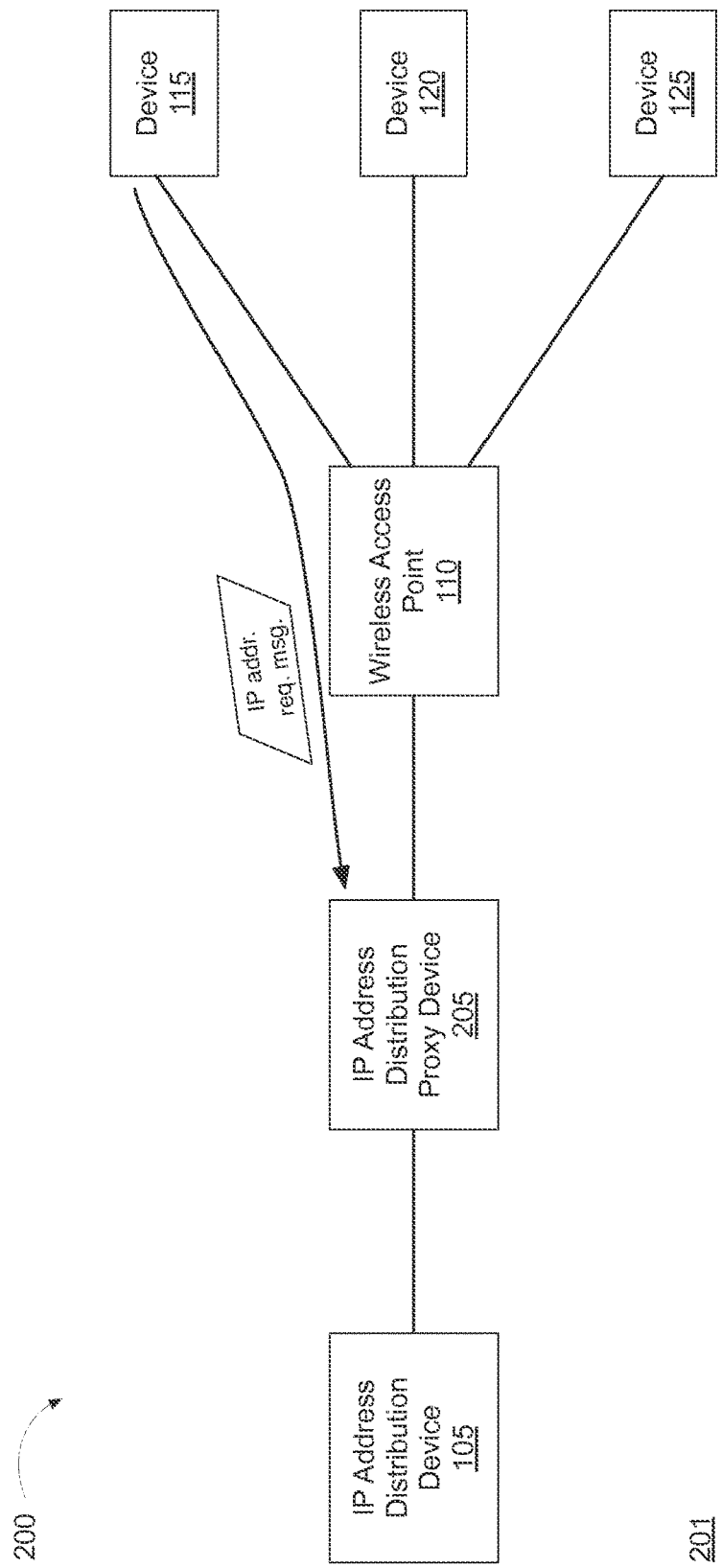
FIGS. 2A-2D show an IP address distribution proxy device in a network in accordance with some embodiments.

Referring now to FIG. 2A, the first stage 201 shows the device 115 sending an IP address request message to the IP address distribution proxy device 205 via the wireless AP 110. The IP address request message includes a MAC address of the device 115. In some embodiments, the IP address request message also includes a response messaging mode indicator that indicates to send responses to IP address request messages using unicast messaging. For this example, the IP address request message includes a response messaging mode indicator, which indicates to send responses to IP address request messages using unicast messaging.

The device 115 in this example sends the IP address request message via broadcast messaging (e.g., the device 115 sends the sends the IP address request message to IP address 255.255.255.255). In response to receiving the IP address request message, the wireless IP 110 broadcasts the message to the IP address distribution proxy device 205. When the IP address distribution proxy device 205 receives the IP address request message, the IP address distribution proxy device 205 extracts the MAC address of the device 115 from the IP address request message for later use. The IP address distribution proxy device 205 then forwards the IP address request message to the IP address distribution device 105.

Figure 2B:
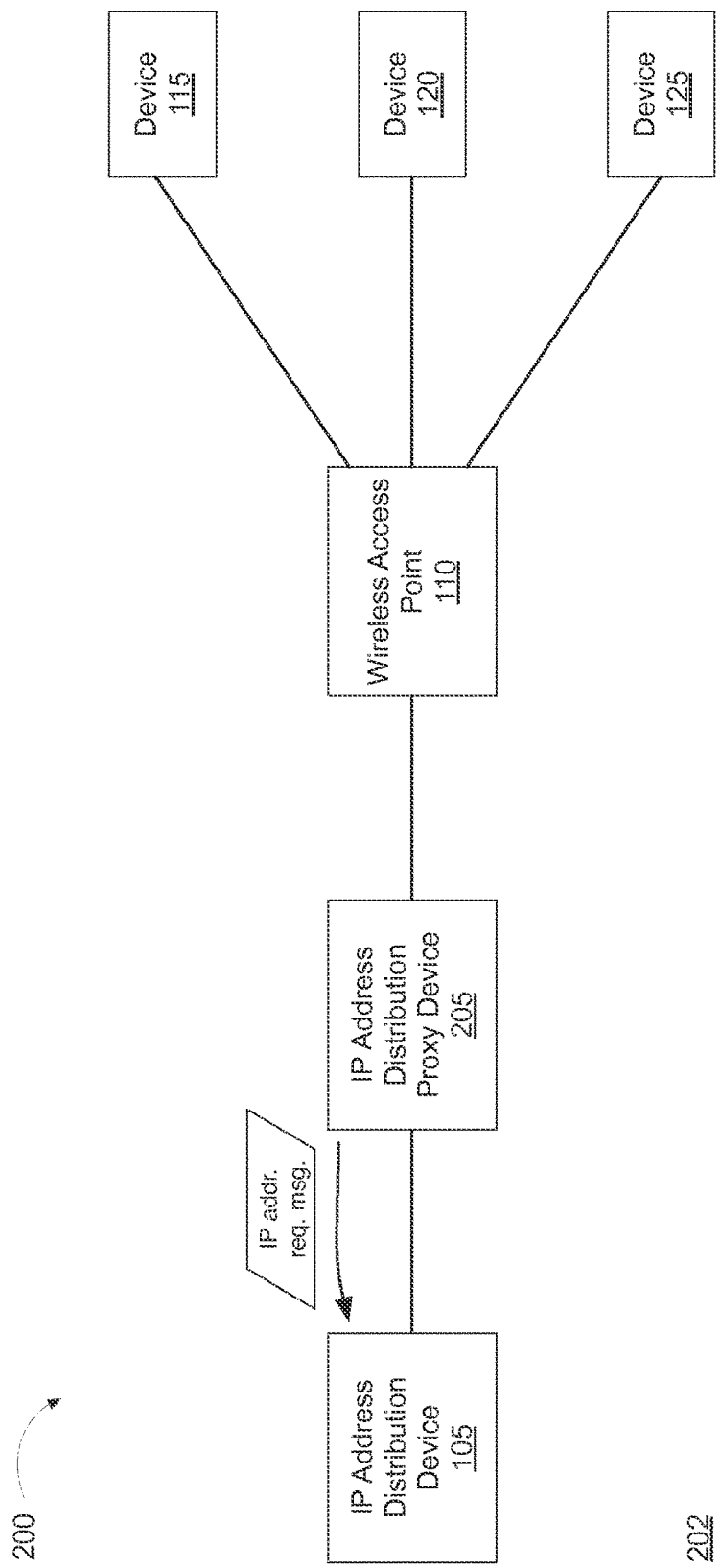

Referring now to FIG. 2B, the second stage 202 shows the IP address distribution proxy device 205 forwarding the IP address request message to the IP address distribution device 105. When the IP address distribution device 105 receives the IP address request message, the IP address distribution device 105 allocates an IP address from a pool of available IP addresses for the device 115.

Figure 2C:
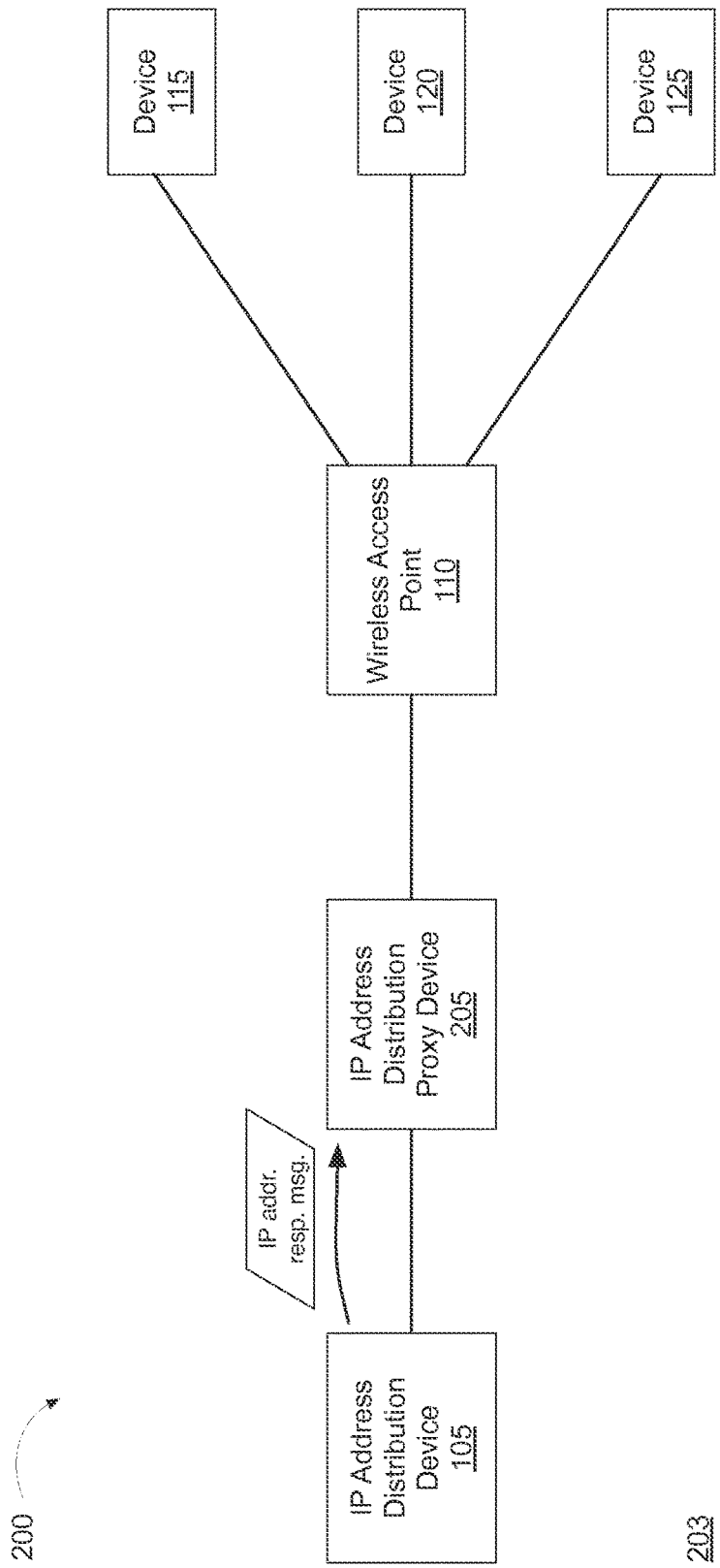

Referring now to FIG. 2C, the third stage 203 shows the IP address distribution device 105 after the IP address distribution device 105 allocated an IP address for the device 115. Specifically, the IP address distribution device 105 is sending an IP address response message to the IP address distribution proxy device 205. The IP address response message includes the allocated IP address for the device 115. In some embodiments, the IP address distribution device 105 sends the IP address response message to the IP address distribution proxy device 205 via unicast messaging while, in other embodiments, the IP address distribution device 105 sends the IP address response message to the IP address distribution proxy device 205 via broadcast messaging. When the IP address distribution proxy device 205 receives the IP address response message, the IP address distribution proxy device 205 forwards the IP address response message to the device 115.

Figure 2D:
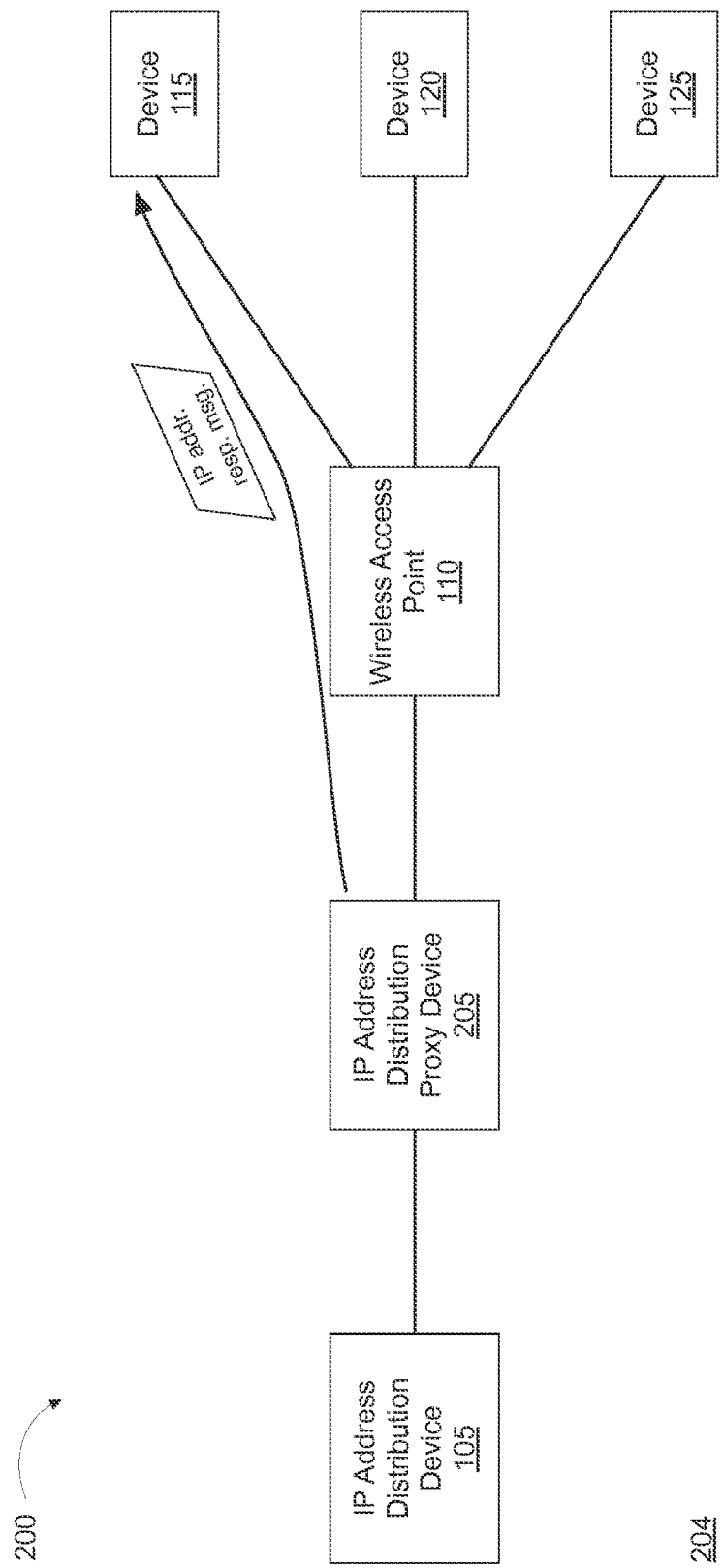

Referring now to FIG. 2D, the fourth stage 204 shows the IP address distribution proxy device 205 forwarding the IP address response message to the device 115 via the wireless AP 110. In this example, the IP address distribution proxy device 105 sends the IP address response message to the device 115 via unicast messaging. In some embodiments, the IP address distribution proxy device 205 sends the IP address response message via unicast messaging when the response messaging mode indicator in the IP address request message indicates to send responses to IP address request messages using unicast messaging. In other embodiments, the IP address distribution proxy device 205 sends the IP address response message via unicast messaging even if the response messaging mode indicator in the IP address request message indicates to send responses to IP address request messages using a messaging mode other than unicast messaging (e.g., broadcast messaging or multicast messaging). In other words, the IP address distribution proxy device 205 in such other embodiments may send responses to IP address request messages using unicast messaging regardless of the messaging mode indicator specified in the IP address request message by device 115.

The IP address distribution proxy device 205 sends the IP address response message via unicast messaging by sending the IP address response message to the extracted MAC address over the layer 2 network. When the device 115 receives the IP address response message, the device 115 configures itself with the IP address specified in the IP address response message.

Referring now to FIGS. 3A-3E, a wireless AP in the network 200 is shown in accordance with some embodiments. Specifically, FIGS. 3A-3E show a wireless AP in the network 200 at five different stages 301, 302, 303, 304, and 305 of distributing an IP address to a device in accordance with some embodiments.

Figure 3A:
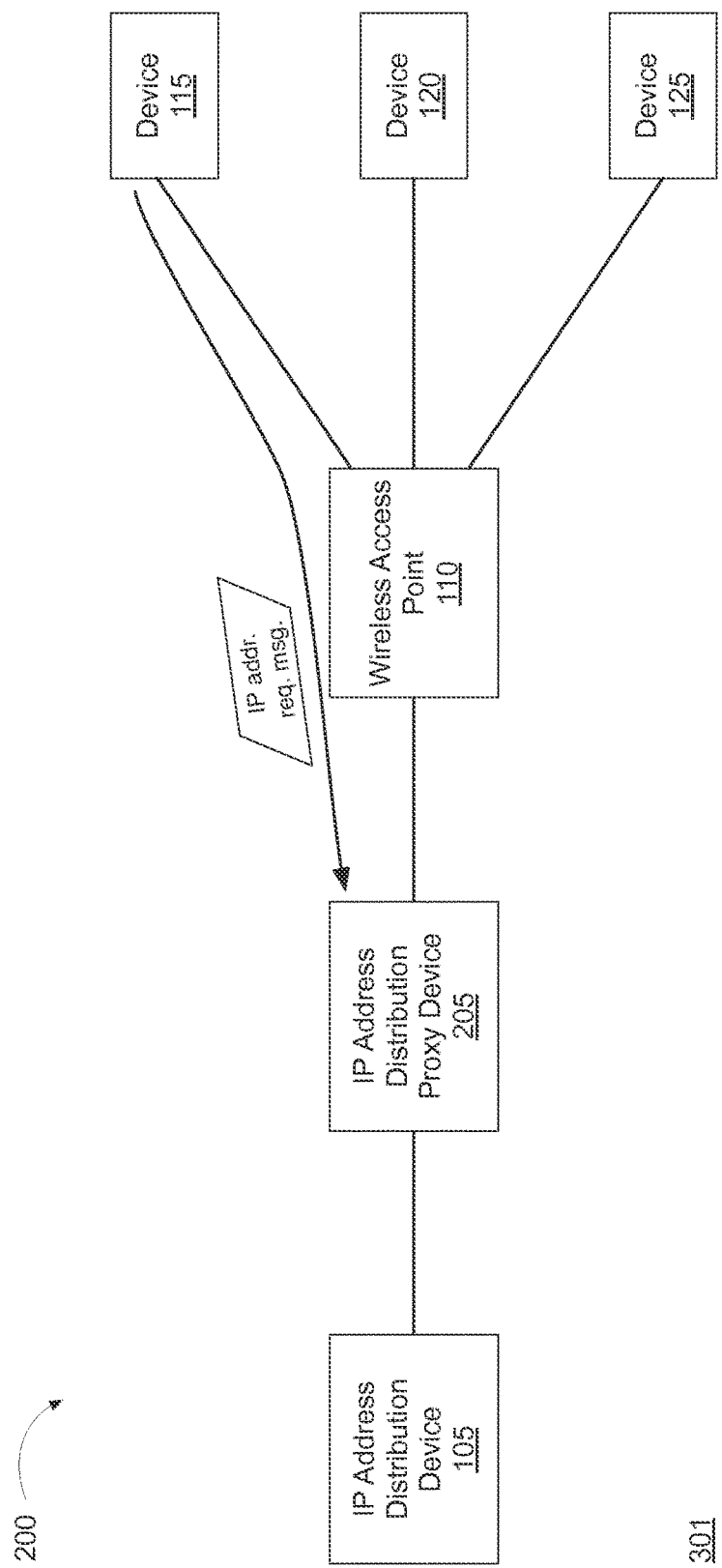
FIGS. 3A-3E show a wireless access point in a network in accordance with some embodiments.

Referring now to FIG. 3A, the first stage 301 shows the device 115 sending an IP address request message to the IP address distribution proxy device 205 via the wireless AP 110. The IP address request message includes a MAC address of the device 115. In some embodiments, the IP address request message also includes a response messaging mode indicator that indicates to send responses to IP address request messages using unicast messaging. For this example, the IP address request message includes a response messaging mode indicator, which indicates to send responses to IP address request messages using unicast messaging.

The device 115 in this example sends the IP address request message via broadcast messaging (e.g., the device 115 sends the sends the IP address request message to IP address 255.255.255.255). In response to receiving the IP address request message, the wireless IP 110 broadcasts the message to the IP address distribution proxy device 205. When the wireless AP 110 receives the IP address request message, the wireless AP 110 extracts the MAC address of the device 115 from the IP address request message for later use. When the IP address distribution proxy device 205 receives the IP address request message, the IP address distribution proxy device 205 forwards the IP address request message to the IP address distribution device 105.

Figure 3B:
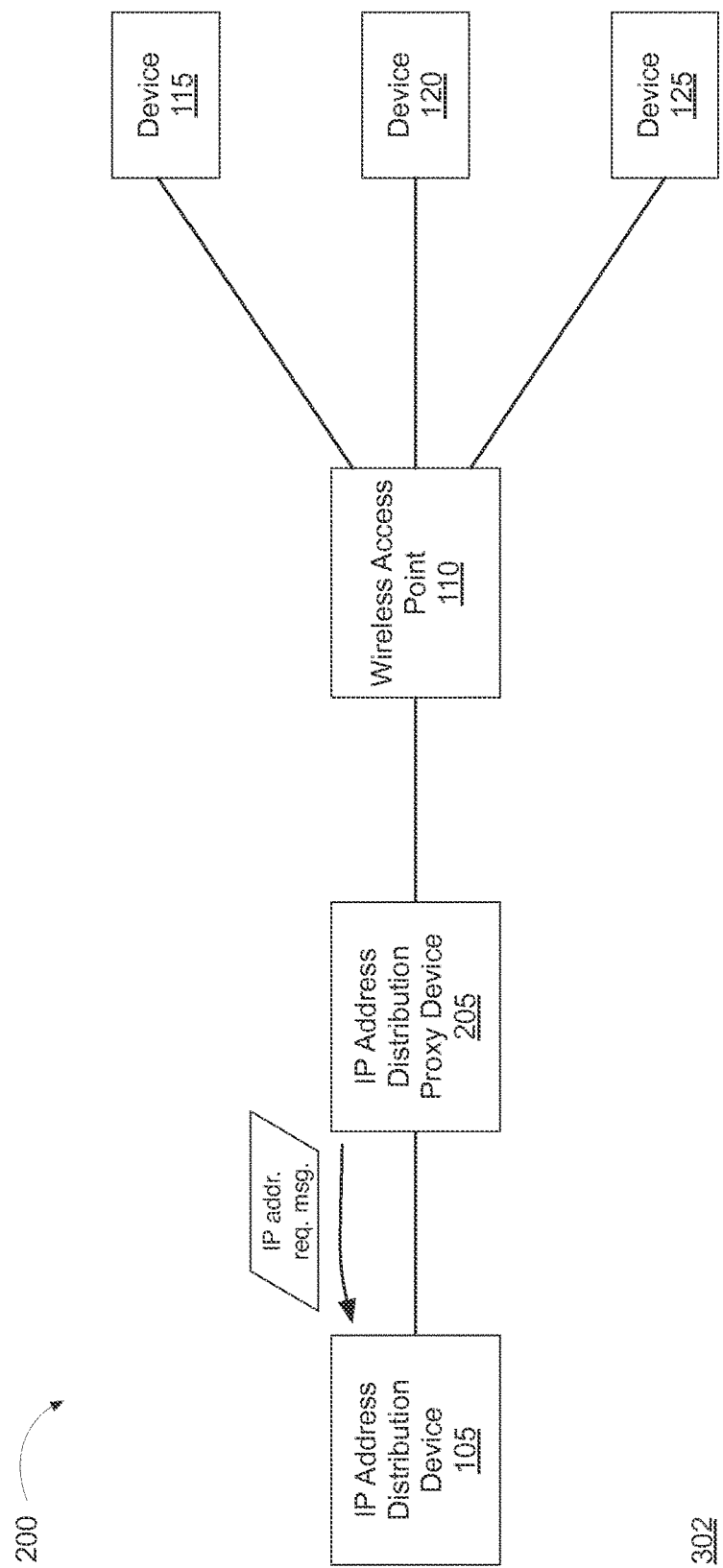

Referring now to FIG. 3B, the second stage 302 shows the IP address distribution proxy device 205 forwarding the IP address request message to the IP address distribution device 105. When the IP address distribution device 105 receives the IP address request message, the IP address distribution device 105 allocates an IP address from a pool of available IP addresses for the device 115.

Figure 3C:
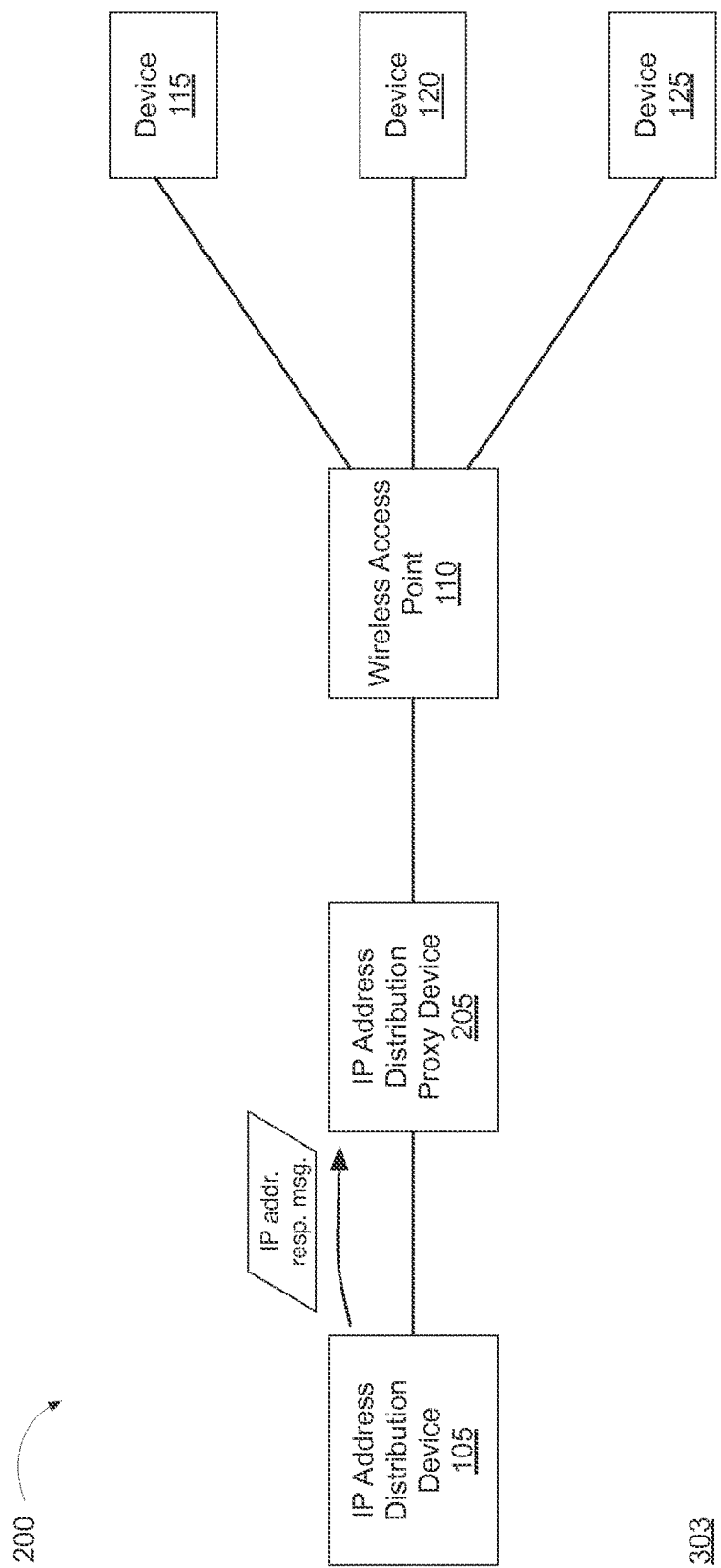

Referring now to FIG. 3C, the third stage 303 shows the IP address distribution device 105 after the IP address distribution device 105 allocated an IP address for the device 115. Specifically, the IP address distribution device 105 is sending an IP address response message to the IP address distribution proxy device 205, which forwards the IP address response message to the wireless AP 110. The IP address response message includes the allocated IP address for the device 115. In some embodiments, the IP address distribution device 105 sends the IP address response message to the IP address distribution proxy device 205 via unicast messaging while, in other embodiments, the IP address distribution device 105 sends the IP address response message to the IP address distribution proxy device 205 via broadcast messaging. When the IP address distribution proxy device 205 receives the IP address response message, the IP address distribution proxy device 205 forwards the IP address response message to the device 115.

Figure 3D:
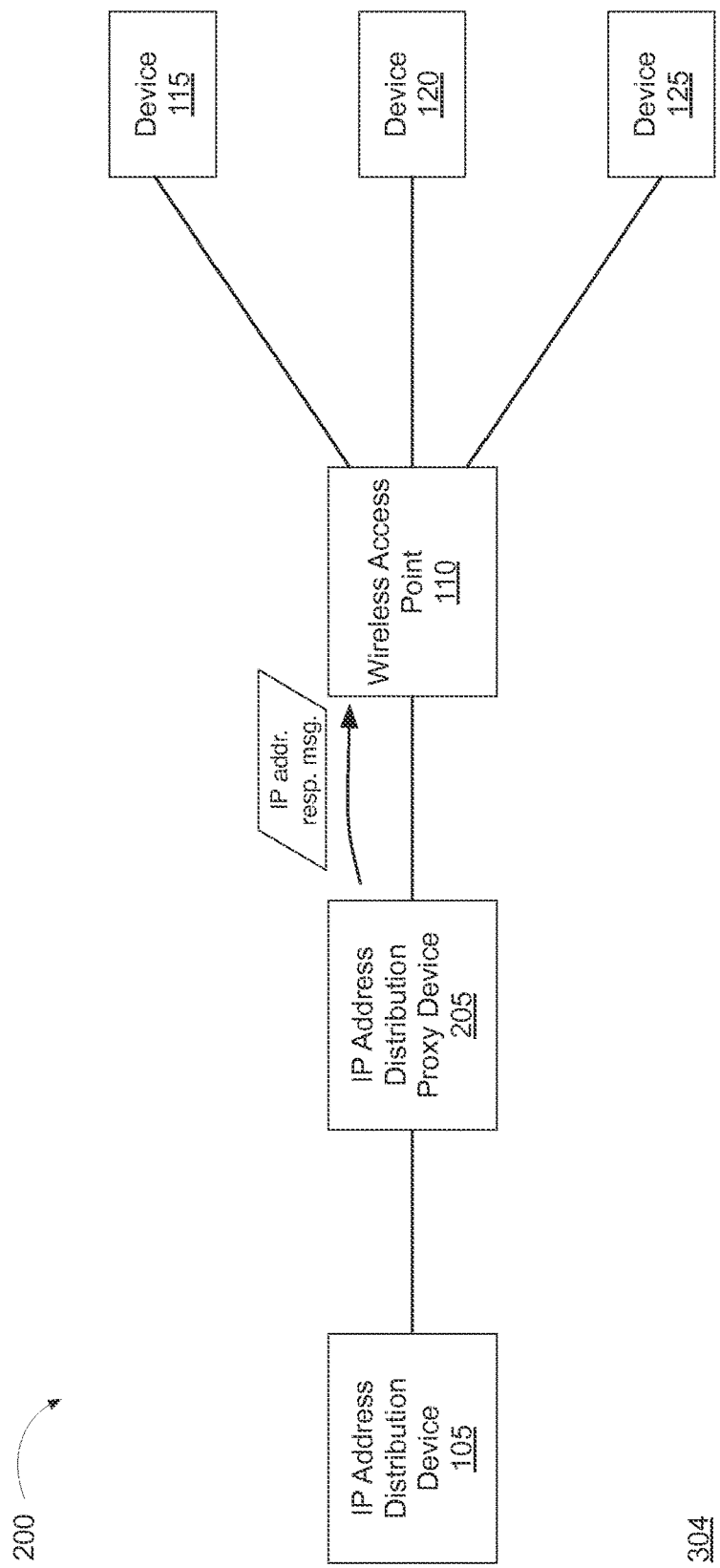

Referring now to FIG. 3D, the fourth stage 304 shows the IP address distribution proxy device 205 sending the IP address response message to the wireless AP 110. In some embodiments, the IP address distribution proxy device 205 sends the IP address response message to the wireless AP 110 via unicast messaging while, in other embodiments, the IP address distribution proxy device 205 sends the IP address response message to the wireless AP 110 via broadcast messaging. When the wireless AP 110 receives the IP address response message, the wireless AP 110 forwards the IP address response message to the device 115.

Figure 3E:
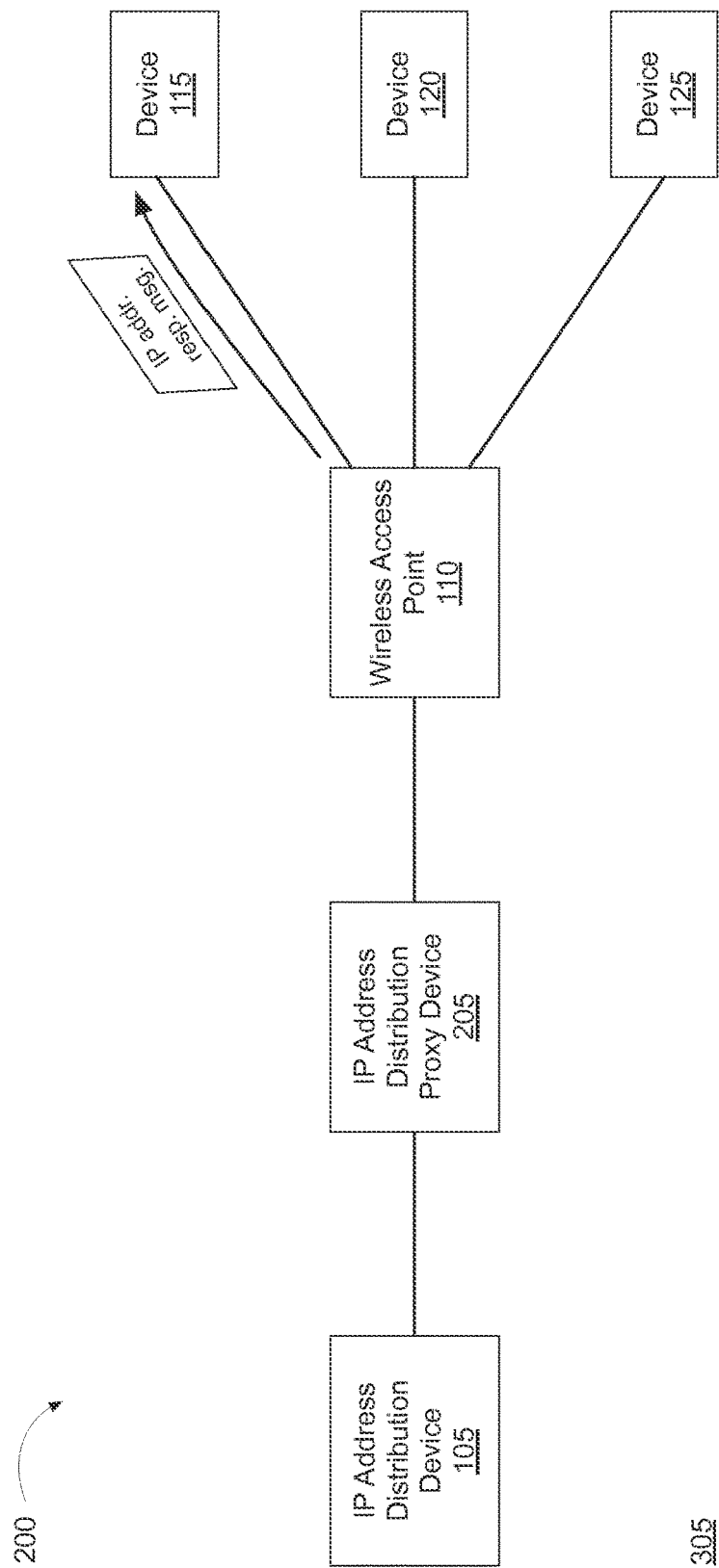

Referring now to FIG. 3E, the fourth stage 305 shows the wireless AP 110 sending the IP address response message to the device 115. In this example, the wireless AP 110 sends the IP address response message to the device 115 via unicast messaging. In some embodiments, the wireless AP 110 sends the IP address response message via unicast messaging when the response messaging mode indicator in the IP address request message indicates to send responses to IP address request messages using unicast messaging. In other embodiments, the wireless AP 110 sends the IP address response message via unicast messaging even if the response messaging mode indicator in the IP address request message indicates to send responses to IP address request messages using a messaging mode other than unicast messaging (e.g., broadcast messaging or multicast messaging). In other words, the wireless AP 110 in such other embodiments may send responses to IP address request messages using unicast messaging regardless of the messaging mode indicator specified in the IP address request message by device 115.

The wireless AP 110 sends the IP address response message via unicast messaging by sending the IP address response message to the extracted MAC address over the layer 2 network. When the device 115 receives the IP address response message, the device 115 configures itself with the IP address specified in the IP address response message.

FIGS. 3A-3E illustrate a wireless AP that performs various features and functions (e.g., sending IP address response messages via unicast messaging). It is appreciated that such features and functions may be implemented in any type of layer-2-transparent device. For example, in some embodiments, a wireless switch may be used instead of a wireless AP.

In addition, FIGS. 3A-3E show an IP address distribution proxy device in a network. It is appreciated that the technique illustrated in FIGS. 3A-3E may be used in the network 100. That is, the wireless AP 100 in FIGS. 1A and 1B may be responsible for extracting the MAC address of the device 115 from the IP address request message and sending the IP address response message, which the wireless AP 110 received from the IP address distribution device 105, to the device 115 using unicast messaging by sending the IP address response message to the extracted MAC address.

The devices illustrated in FIGS. 1A, 1B, 2A-2D, and 3A-3E are shown for the purposes of simplicity and explanation. It is appreciated that the networks may include additional and/or different devices. For example, the networks may include additional IP address distribution devices, IP address distribution proxy devices, wireless APs, devices, etc. The networks may also include different devices such as networking switches, networking routers, networking bridges, name servers, etc.

FIG. 4 shows a flow diagram for handling the distribution of IP addresses in accordance with some embodiments. In some embodiments, a device (e.g., the IP address distribution device 105 in FIGS. 1A and 1B) that handles allocating IP addresses for devices (e.g., the device 115, 120, or 125) performs the operations described in FIG. 4.

At step 410, the device receives an IP address request message from a requesting device. Referring to FIG. 1A as an example, the IP address distribution device 105 receives an IP address request message from the device 115 via the wireless AP 110.

At step 420, the device allocates an IP address for the requesting device. In some embodiments, the device allocates an IP address from a pool of available IP addresses. At step 430, the device generates an IP address response message based on the allocated IP address. In particular, the IP address response message includes the IP address allocated for the requesting device.

At step 440, the device sends the IP address response message to the requesting device via unicast messaging. In some embodiments, the device sends the IP address response message to the requesting device by extracting the MAC address of the requesting device from the IP address request message and sending the IP address response message to the extracted MAC address over a layer 2 network. Referring to FIG. 1B as an example, the IP address distribution device 105 sends an IP address response message to the device 115 via the wireless AP 110 by sending the IP address response message to the MAC address of the device 115. It is appreciated that the device may send the IP address response message using unicast messaging if the requesting device requests to receive the response via unicast messaging. It is also appreciated that the device may send the IP address response message using unicast messaging despite the requesting device requesting to receive the response via non-unicast messaging (e.g., broadcast messaging, multicast messaging, etc.).

Figure 5:
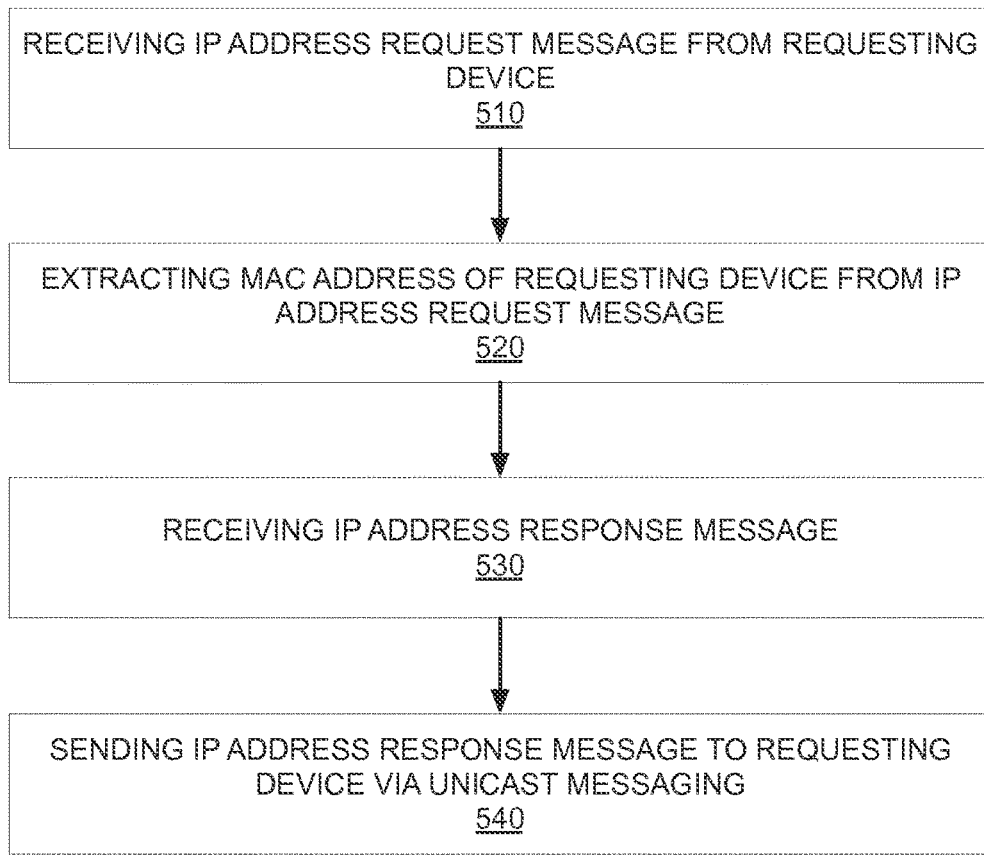
FIG. 5 shows a flow diagram for managing IP address request and response messages in accordance with some embodiments.

FIG. 5 shows a flow diagram for managing IP address request and response messages in accordance with some embodiments. In some embodiments, a device (e.g., the IP address distribution proxy device 205 in FIGS. 2A-2D and the wireless AP 110 in FIGS. 3A-3E) that serves as an intermediary between an IP address distribution device and devices (e.g., the device 115, 120, or 125) requesting IP addresses from the IP address distribution device performs the operations described in FIG. 5.

At step 510, the device receives an IP address request message from a requesting device. Referring to FIG. 2A as an example, the IP address distribution proxy device 205 receives an IP address request message from the device 115 via the wireless AP 110. Referring to FIG. 3A as another example, the wireless AP 110 receives an IP address request message from the device 115.

At step 520, the device extracts a MAC address of the requesting device from the IP address request message. The device then sends the IP address request message to a device that allocates IP addresses. Referring to FIG. 2B as an example, the IP address distribution proxy device 205 sends the IP address request message to the IP address distribution device 105. Referring to FIG. 3B as another example, the wireless AP 110 sends the IP address request message to the IP address distribution proxy device 205, which in turn, forwards the IP address request message to the IP address distribution device 105.

At step 530, the device receives an IP address response message. The IP address response message includes an IP address allocated for the requesting device. Referring to FIG. 2C as an example, the IP address distribution proxy device 205 receives an IP address response message from the IP address distribution device 105. Referring to FIG. 3C as another example, the wireless AP 110 receives an IP address response message from the IP address distribution proxy device 205, which received the IP address response message from the IP address distribution device 105.

At step 540, the device sends the IP address response message to the requesting device via unicast messaging. In some embodiments, the device sends the IP address response message to the requesting device by sending the IP address response message to the extracted MAC address (the MAC address extracted in operation 520) over a layer 2 network. Referring to FIG. 2D as an example, the IP address distribution proxy device 205 sends an IP address response message to the device 115 via unicast messaging by sending the IP address response message to the MAC address of the device 115. Referring to FIG. 3D as another example, the wireless AP 110 sends an IP address response message to the device 115 via unicast messaging by sending the IP address response message to the MAC address of the device 115. It is appreciated that the device may send the IP address response message using unicast messaging if the requesting device requests to receive the response via unicast messaging. It is also appreciated that the device may send the IP address response message using unicast messaging despite the requesting device requesting to receive the response via non-unicast messaging (e.g., broadcast messaging, multicast messaging, etc.).

FIGS. 1A, 1B, 2A-2D, 3A-3E, 5, and 6 illustrate techniques related to IP address request messages and IP address response messages. It is appreciated that the same and/or similar techniques may be implemented for other types of messaging related to distributing IP addresses. For example, before transmitting IP address request messages and IP address response messages, a device (e.g., the device 115, 120, or 125) may send a discovery message to an IP address distribution device (e.g., the IP address distribution device 105) and/or an IP address distribution proxy device (e.g., the IP address distribution proxy device 205). In response, the IP address distribution device and/or the IP address distribution proxy device may send an IP address offer message back to the device. In such an example, the IP address distribution device, the IP address distribution proxy, or a wireless AP may implement the same or similar unicast messaging techniques described above by reference to FIGS. 1A, 1B, 2A-2D, 3A-3E, 5, and 6 for the IP address offer message.

Figure 6:
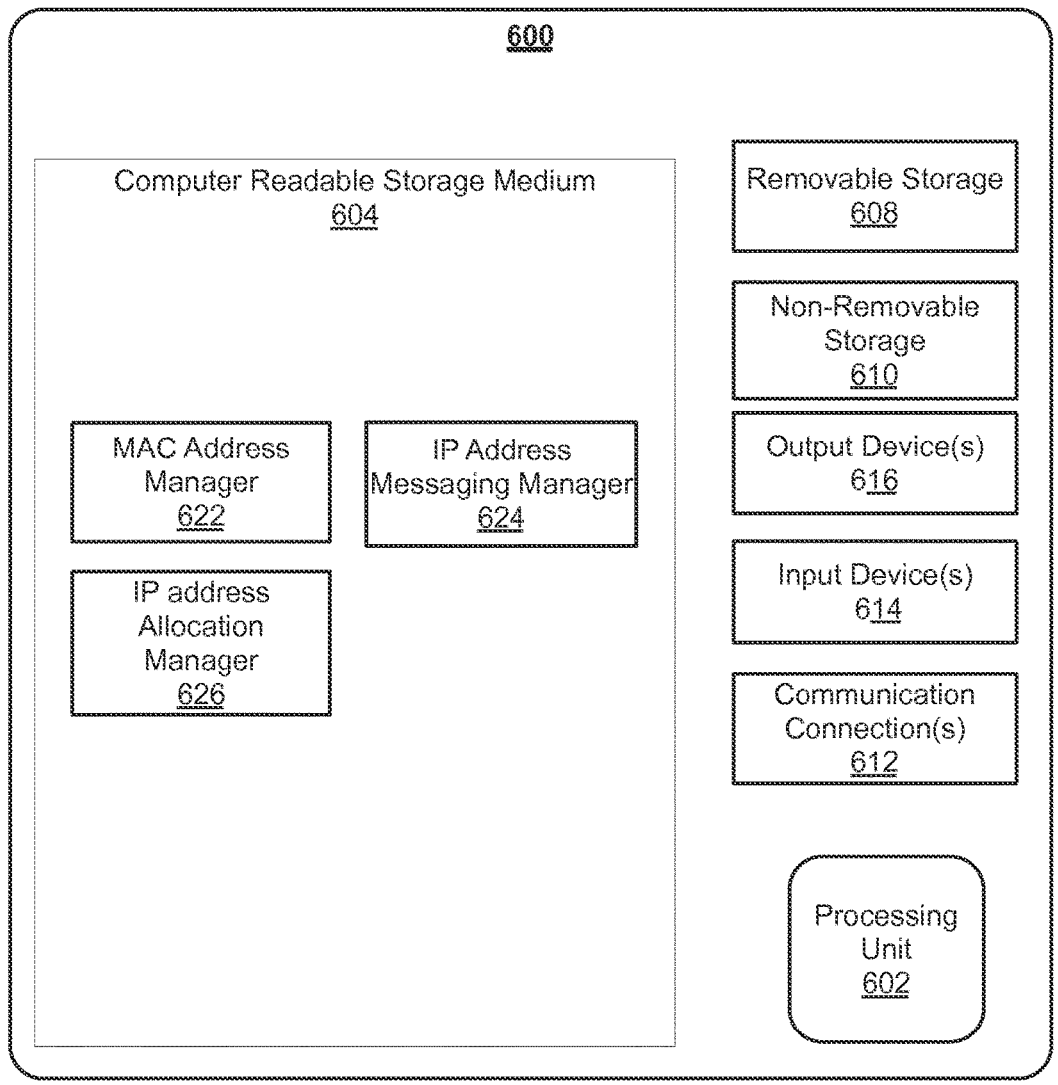
FIG. 6 shows a computer system in accordance with some embodiments.

Referring now to FIG. 6, a block diagram of a computer system in accordance with some embodiments is shown. With reference to FIG. 6, a system module for implementing embodiments includes a general purpose computing system environment, such as computing system environment 600. Computing system environment 600 may include, but is not limited to, servers, switches, routers, desktop computers, laptops, tablets, mobile devices, and smartphones. In its most basic configuration, computing system environment 600 typically includes at least one processing unit 602 and machine readable storage medium 604. Depending on the exact configuration and type of computing system environment, machine readable storage medium 604 may be volatile (such as RAM), non-volatile (such as ROM, flash memory, etc.) or some combination of the two. Portions of machine readable storage medium 604 when executed facilitate the forwarding/routing of network data through a management network, the management of backup data of nodes in the management network, the restoration of such nodes based on the backup data, the distribution of special link configuration information, and establishing special links based on the special link configuration information.

Additionally, in various embodiments, computing system environment 600 may also have other features/functionality. For example, computing system environment 600 may also include additional storage (removable and/or non-removable) including, but not limited to, magnetic or optical disks or tape. Such additional storage is illustrated by removable storage 608 and non-removable storage 610. Computer storage media includes volatile and nonvolatile, removable and non-removable media implemented in any method or technology for storage of information such as machine readable instructions, data structures, program modules or other data. Machine readable medium 604, removable storage 608 and nonremovable storage 610 are all examples of computer storage media. Computer storage media includes, but is not limited to, RAM, ROM, EEPROM, flash memory or other memory technology, expandable memory (e.g., USB sticks, compact flash cards, SD cards), CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 600. Any such computer storage media may be part of computing system environment 600.

In some embodiments, computing system environment 600 may also contain communications connection(s) 612 that allow it to communicate with other devices. Communications connection(s) 612 is an example of communication media. Communication media typically embodies machine readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term machine readable media as used herein includes both storage media and communication media.

Communications connection(s) 612 may allow computing system environment 600 to communicate over various networks types including, but not limited to, fibre channel, small computer system interface (SCSI), Bluetooth, Zigbee, Z-Wave, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 612 connect to may run a plurality of network protocols including, but not limited to, transmission control protocol (TCP), user datagram protocol (UDP), IP, real-time transport protocol (RTP), real-time transport control protocol (RTCP), file transfer protocol (FTP), and hypertext transfer protocol (HTTP).

In further embodiments, computing system environment 600 may also have input device(s) 614 such as keyboard, mouse, a terminal or terminal emulator (either connected or remotely accessible via telnet, SSH, http, SSL, etc.), pen, voice input device, touch input device, remote control, etc. Output device(s) 616 such as a display, a terminal or terminal emulator (either connected or remotely accessible via telnet, SSH, http, SSL, etc.), speakers, light emitting diodes (LEDs), etc. may also be included. All these devices are well known in the art and are not discussed at length.

In one embodiment, machine readable storage medium 604 includes a MAC address manager module 622, an IP address messaging manager module 624, and an IP address allocation manager 626. The MAC address manager module 622 is operable to extract MAC addresses from IP address request messages and manage such MAC addresses in accordance with flow diagrams 400 and 500, for example. The IP address messaging manager module 624 may be used to send IP address response messages to requesting devices via unicast messaging in accordance with flow diagrams 400 and 500, for example. The IP address allocation manager 626 may be responsible for allocating IP addresses for requesting devices in accordance with flow diagram 400, for example.

It is appreciated that implementations according to some embodiments that are described with respect to a computer system are merely exemplary and not intended to limit the scope of the embodiments. For example, some embodiments may be implemented on devices such as switches and routers, which may contain application specific integrated circuits (ASICs), field programmable gate arrays (FPGAs), etc. It is appreciated that these devices may include a machine readable medium for storing instructions for implementing methods according to flow diagrams 400 and 500.

Referring now to FIG. 7, a block diagram of another exemplary computer system in accordance with some embodiments is shown. FIG. 7 depicts a block diagram of a computer system 710 suitable for implementing the present disclosure. Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), a storage interface 734, a floppy disk drive 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712). It is appreciated that the network interface 748 may include one or more Ethernet ports, wireless local area network (WLAN) interfaces, Bluetooth interfaces, Zigbee interfaces, Z-Wave interfaces, etc., but are not limited thereto. System memory 717 includes an IP address distribution manager module 750 which is operable to manage operations related to distributing IP addresses for requesting devices. According to one embodiment, the IP address distribution manager module 750 may include other modules for carrying out various tasks. For example, the IP address distribution manager module 750 may include the MAC address manager module 622, the IP address messaging manager module 624, and the IP address allocation manager 626, as discussed with respect to FIG. 6 above. It is appreciated that the IP address distribution manager module 750 may be located anywhere in the system and is not limited to the system memory 717. As such, residing of the IP address distribution manager module 750 within the system memory 717 is merely exemplary and not intended to limit the scope of the embodiments. For example, parts of the IP address distribution manager module 750 may reside within the central processor 714 and/or the network interface 748 but are not limited thereto.

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 710 are generally stored on and accessed via a machine readable medium, such as a hard disk drive (e.g., fixed disk 744), an optical drive (e.g., optical drive 740), a floppy disk unit 737, or other storage medium. Additionally, applications can be in the form of electronic signals modulated in accordance with the application and data communication technology when accessed via network modem 747 or interface 748.

Storage interface 734, as with the other storage interfaces of computer system 710, can connect to a standard machine readable medium for storage and/or retrieval of information, such as a fixed disk drive 744. Fixed disk drive 744 may be a part of computer system 710 or may be separate and accessed through other interface systems. Network interface 748 may provide multiple connections to other devices. Furthermore, modem 747 may provide a direct connection to a remote server via a telephone link or to the Internet via an internet service provider (ISP). Network interface 748 may provide one or more connection to a data network, which may include any number of networked devices. It is appreciated that the connections via the network interface 748 may be via a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present disclosure. The devices and subsystems can be interconnected in different ways from that shown in FIG. 7. The operation of a computer system such as that shown in FIG. 7 is readily known in the art and is not discussed in detail in this application. Code to implement the present disclosure can be stored in machine-readable storage media such as one or more of system memory 717, fixed disk 744, optical disk 742, or floppy disk 738. The operating system provided on computer system 710 may be MS-DOS®, MS-WINDOWS®, OS/2®, UNIX®, Linux®, or any other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for purpose of explanation, has been described with reference to specific embodiments. However, the illustrative discussions above are not intended to be exhaustive or to limit the embodiments disclosed. Many modifications and variations are possible in view of the above teachings.

What is claimed is:

1. A system comprising:
an Internet Protocol (IP) address distribution device configured to allocate IP addresses for a set of devices; and
an access point configured to communicate wirelessly with the set of devices,
wherein the IP address distribution device is further configured to receive IP address request messages from the set of devices via the access point, wherein the IP address request messages are for requesting IP addresses from the IP address distribution device,
wherein the IP address distribution device is further configured to send IP address response messages that include IP addresses for the set of devices to the set of devices via the access point using unicast messaging;
wherein the IP address request messages further include response messaging mode indicators that indicate to send responses to the IP address request messages using at least one of: unicast messaging and a messaging mode other than unicast messaging;
wherein the IP address response messages are sent using unicast messaging regardless of the response messaging mode indicators in the IP address request messages;
wherein the IP address response messages are sent using unicast messaging by extracting media access control (MAC) addresses of the set of devices from the IP address request messages and sending the IP address response messages to the extracted MAC address over a layer 2 network; and
wherein the set of devices configure themselves with the IP addresses specified in the IP address response messages.

2. The system as described in claim 1, wherein the IP address distribution device is further configured to receive the IP address request messages from the set of devices, via the access point, using broadcast messaging, and wherein, prior to the set of devices sending IP address request messages, the set of devices send discovery messages to the IP address distribution device, and wherein the IP address distribution device sends IP address offer messages back to the set of devices.

3. The system as described in claim 1, wherein the IP address distribution device is a BOOTP server.

4. The system as described in claim 1, wherein the IP address distribution device, the access point, and the set of devices are connected in a layer 2 network according to a flat network topology, and wherein the IP address distribution device and the access point communicate via Ethernet.

5. The system as described in claim 1, wherein each device in the set of devices has a media access control (MAC) address, wherein the IP address request messages each includes a MAC address of a device in the set of devices.

6. The system as described in claim 5, wherein the IP address request message further includes a response messaging mode indicator that indicates to send responses to the IP address request message using unicast messaging.

7. The system as described in claim 5, wherein the IP address request message further includes a response messaging mode indicator that indicates to send responses to the IP address request message using a messaging mode other than unicast messaging.

8. The system as described in claim 5, wherein the IP address distribution device is further configured to send the IP address response messages to the set of devices via the access point using unicast messaging by sending the IP address response messages to the MAC addresses of the set of devices, and wherein the access point is a switch.

9. A system comprising:
an Internet Protocol (IP) address distribution device configured to allocate IP addresses for a set of devices;
an access point configured to communicate wirelessly with the set of devices;
an IP address distribution proxy device configured to receive IP address request messages from the set of devices; and
wherein the IP address distribution proxy device is further configured to receive IP address request messages from the set of devices via the access point, wherein the IP address request messages are for requesting IP addresses from the IP address distribution device,
wherein the IP address distribution device is further configured to send IP address response messages that include IP addresses allocated for the set of devices to the IP address distribution proxy device, wherein the IP address distribution proxy device is further configured to forward the IP address response messages to the set of devices via the access point using unicast messaging;
wherein the IP address request messages further include response messaging mode indicators that indicate to send responses to the IP address request messages using at least one of: unicast messaging and a messaging mode other than unicast messaging;
wherein the IP address response messages are sent using unicast messaging regardless of the response messaging mode indicators in the IP address request messages;
wherein the IP address response messages are sent using unicast messaging by extracting media access control (MAC) addresses of the set of devices from the IP address request messages and sending the IP address response messages to the extracted MAC address over a layer 2 network; and
wherein the set of devices configure themselves with the IP addresses specified in the IP address response messages.

10. The system as described in claim 9, wherein the IP address distribution proxy device is further configured to receive the IP address request messages from the set of devices, via the access point, using broadcast messaging, and wherein, prior to the set of devices sending IP address request messages, the set of devices send discovery messages to the IP address distribution device, and wherein the IP address distribution device sends IP address offer messages back to the set of devices.

11. The system as described in claim 9, wherein the IP address distribution device is a BOOTP server.

12. The system as described in claim 11, wherein the IP address distribution proxy device is a BOOTP proxy server.

13. The system as described in claim 9, wherein each device in the set of devices has a media access control (MAC) address, wherein the IP address request messages each includes a MAC address of a device in the set of devices.

14. The system as described in claim 13, wherein the IP address distribution proxy device is further configured to extract the MAC addresses of the set of devices from the IP address request messages.

15. The system as described in claim 14, wherein the IP address distribution proxy device is further configured to send the IP address response messages to the set of devices via the access point using unicast messaging by sending the IP address response messages to the MAC addresses of the set of devices, and wherein the IP address distribution device and the access point communicate via Ethernet.

16. A system comprising:
an Internet Protocol (IP) address distribution device configured to allocate IP addresses for a set of devices;
an access point configured to communicate wirelessly with the set of devices; and
wherein the IP address distribution device is further configure to receive IP address request messages from the set of devices via the access point, wherein the IP address request messages are for requesting IP addresses from the IP address distribution device,
wherein the access point is further configured to receive IP address response messages that include IP addresses for the set of devices from the IP address distribution device, wherein the access point is further configured to send the IP address response messages to the set of devices via the access point using unicast messaging;
wherein the IP address request messages further include response messaging mode indicators that indicate to send responses to the IP address request messages using at least one of: unicast messaging and a messaging mode other than unicast messaging;
wherein the IP address response messages are sent using unicast messaging regardless of the response messaging mode indicators in the IP address request messages;
wherein the IP address response messages are sent using unicast messaging by extracting media access control (MAC) addresses of the set of devices from the IP address request messages and sending the IP address response messages to the extracted MAC address over a layer 2 network; and
wherein the set of devices configure themselves with the IP addresses specified in the IP address response messages.

17. The system as described in claim 16, wherein each device in the set of devices has a media access control (MAC) address, wherein the IP address request messages each includes a MAC address of a device in the set of devices, and wherein the IP address distribution device and the access point communicate via Ethernet.

18. The system as described in claim 17, wherein the access point is further configured to extract the MAC addresses of the set of devices from the IP address request messages, and wherein the access point is a switch.

19. The system as described in claim 18, wherein the access point is further configured to send the IP address response messages to the set of devices using unicast messaging by sending the IP address response messages to the MAC addresses of the set of devices, and wherein, prior to the set of devices sending IP address request messages, the set of devices send discovery messages to the IP address distribution device, and wherein the IP address distribution device sends IP address offer messages back to the set of devices.

20. The system as described in claim 16, wherein the IP address distribution device, the access point, and the set of devices are connected in a layer 2 network according to a flat network topology.

* * * * *